(12) United States Patent
Schweitzer, III et al.

(10) Patent No.: US 8,405,940 B2
(45) Date of Patent: Mar. 26, 2013

(54) SYSTEMS AND METHODS FOR GENERATOR GROUND FAULT PROTECTION

(75) Inventors: Edmund O. Schweitzer, III, Pullman, WA (US); Veselin Skendzic, Pullman, WA (US); Gabriel Benmouyal, Boucherville (CA); Bruce A. Hall, Pullman, WA (US); Rogerio Scharlach, San Ramon, CA (US)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 247 days.

(21) Appl. No.: 12/903,104

(22) Filed: Oct. 12, 2010

(65) Prior Publication Data
US 2011/0085272 A1 Apr. 14, 2011

Related U.S. Application Data

(60) Provisional application No. 61/251,144, filed on Oct. 13, 2009.

(51) Int. Cl.
*H02H 3/00* (2006.01)
(52) U.S. Cl. .......................................................... 361/42
(58) Field of Classification Search ...................... 361/42
See application file for complete search history.

(56) References Cited

U.S. PATENT DOCUMENTS

| | | | |
|---|---|---|---|
| 2,881,319 A | 4/1959 | Sills | |
| 3,727,123 A | 4/1973 | Smith | |
| 3,973,171 A | 8/1976 | Howell | |
| 4,000,464 A | 12/1976 | Nussel | |
| 4,001,646 A | 1/1977 | Howell | |
| 4,029,951 A | 6/1977 | Berry | |
| 4,066,950 A | 1/1978 | Rumold | |
| 4,148,087 A | 4/1979 | Phadke | |
| 4,159,499 A | 6/1979 | Breskin | |
| 4,161,011 A | 7/1979 | Wilkinson | |
| 4,206,398 A | 6/1980 | Janning | |
| 4,245,182 A | 1/1981 | Aotsu | |
| 4,321,643 A | 3/1982 | Vernier | |
| 4,371,832 A | 2/1983 | Wilson | |

(Continued)

FOREIGN PATENT DOCUMENTS

| JP | 52022422 | 9/1978 |
|---|---|---|
| JP | 54077549 | 1/1981 |

(Continued)

OTHER PUBLICATIONS

Rik Pintelon, Johan Schoukens, System Identification: A Frequency Domain, Section 4.3 (pp. 119-131), Jan. 1, 2001.

(Continued)

*Primary Examiner* — Ronald W Leja
(74) *Attorney, Agent, or Firm* — Stoel Rives LLP

(57) ABSTRACT

A generator winding-to-ground fault detection system is disclosed that includes a signal injection source in electrical communication with a winding of an electric power generator via an injection transformer. The winding may be coupled to ground via a winding-to-ground path and the signal generation source may generate an injection signal capable of being injected to the winding using the injection transformer. The disclosed system may further include a protection module in communication with the signal injection source and the electric power generator configured to receive the injection signal and a signal relating to the current through the winding-to-ground path, and to determine the occurrence of a winding-to-ground fault condition based at least in part on the injection signal and the signal relating to the current through the winding-to-ground path.

26 Claims, 9 Drawing Sheets

U.S. PATENT DOCUMENTS

| | | | |
|---|---|---|---|
| 4,511,811 A | 4/1985 | Gupta |
| 4,542,468 A | 9/1985 | Taniguti |
| 4,556,946 A | 12/1985 | Taniguti |
| 4,558,309 A | 12/1985 | Antonevich |
| 4,667,263 A | 5/1987 | Morris |
| 4,820,991 A | 4/1989 | Clark |
| 4,825,327 A | 4/1989 | Alexander |
| 4,851,758 A | 7/1989 | Ostada |
| 4,939,506 A | 7/1990 | Gram |
| 5,057,962 A | 10/1991 | Alley |
| 5,264,778 A | 11/1993 | Kimmel |
| 5,363,047 A | 11/1994 | Dresti |
| 5,508,620 A | 4/1996 | Pfiffner |
| 5,514,963 A | 5/1996 | Korbmacher |
| 5,519,300 A | 5/1996 | Leon |
| 5,581,470 A | 12/1996 | Pawloski |
| 5,592,393 A | 1/1997 | Yalla |
| 5,633,550 A | 5/1997 | Meehan |
| 5,675,465 A | 10/1997 | Tanaka |
| 5,739,693 A | 4/1998 | Pfiffner |
| 5,764,462 A | 6/1998 | Tanaka |
| 5,805,395 A | 9/1998 | Hu |
| 5,933,306 A | 8/1999 | Santos |
| 5,982,595 A | 11/1999 | Pozzuoli |
| 6,121,886 A | 9/2000 | Anderson |
| 6,169,489 B1 | 1/2001 | Kliman |
| 6,262,550 B1 | 7/2001 | Kliman |
| 6,294,898 B2 | 9/2001 | Lawson |
| 6,396,284 B1 | 5/2002 | Tisdale |
| 6,426,632 B1 | 7/2002 | Clunn |
| 6,459,269 B1 | 10/2002 | Jones |
| 6,492,801 B1 | 12/2002 | Sims |
| 6,525,504 B1 | 2/2003 | Nygren |
| 6,714,020 B2 | 3/2004 | Hobelsberger |
| 6,794,879 B2 | 9/2004 | Lawson |
| 6,794,883 B2 | 9/2004 | Klingel |
| 6,815,932 B2 | 11/2004 | Wall |
| 6,839,207 B2 | 1/2005 | Falliot |
| 6,924,565 B2 | 8/2005 | Wilkins |
| 6,924,628 B2 | 8/2005 | Thompson |
| 6,975,946 B2 | 12/2005 | Al-Hamrani |
| 6,992,490 B2 | 1/2006 | Nomoto |
| 7,006,935 B2 | 2/2006 | Seki |
| 7,253,634 B1 | 8/2007 | Kasztenny |
| 7,304,403 B2 | 12/2007 | Xu |
| 7,498,818 B2 | 3/2009 | Benmouyal |
| 7,528,611 B2 | 5/2009 | Kasztenny |
| 7,532,010 B2 | 5/2009 | Kamel |
| 7,710,693 B2 | 5/2010 | Guzman-Casillas |
| 7,804,303 B2 | 9/2010 | Benmouyal |
| 2001/0001534 A1 | 5/2001 | Lawson |
| 2002/0128759 A1 | 9/2002 | Sodoski |
| 2002/0140433 A1 | 10/2002 | Lawson |
| 2005/0033481 A1 | 2/2005 | Budhraja |
| 2006/0125486 A1* | 6/2006 | Premerlani et al. ........... 324/512 |
| 2009/0160454 A1* | 6/2009 | Johansson et al. ........... 324/509 |
| 2009/0219030 A1 | 9/2009 | Salem |
| 2009/0254297 A1 | 10/2009 | Bengtsson |
| 2012/0112758 A1* | 5/2012 | Weems et al. ................ 324/509 |

FOREIGN PATENT DOCUMENTS

| | | |
|---|---|---|
| JP | 2003777 | 9/1991 |
| JP | 5318853 | 7/1995 |
| JP | 9309737 | 5/1999 |
| JP | 11140927 | 11/2000 |
| WO | WO0239642 | 5/2002 |

OTHER PUBLICATIONS

Beckwith Electric Co., M-3425A, Generator Protection, Published: 2001.

Siemens AG, Numerical Machine Protection Manual, Published 1996.

Type DGF Generator Field Relay, ABB Automation, Inc. Feb. 1977.

J.Lewis Blackburn, Protective Relaying Principles and Applications, Chapter 8: Generator Protection, pp. 262-267, 1997.

Tyco Electronics Energy Division, Installation and Operating Instructions R.O.C.O.F. Protection Relay, Nov. 2002.

PCT/US2010/052452, Patent Cooperation Treaty, International Search Report and Written Opinion of the International Searching Authority, Dec. 9, 2010.

* cited by examiner

SYSTEMS AND METHODS FOR GENERATOR GROUND FAULT PROTECTION

RELATED APPLICATIONS

This application claims priority under 35 U.S.C. §119(e) to U.S. Provisional Patent Application No. 61/251,144, filed Oct. 13, 2009, and entitled "GENERATOR STATOR GROUND FAULT PROTECTION," which is hereby incorporated by reference in its entirety.

TECHNICAL FIELD

This disclosure relates to systems and methods for protecting an electrical generator and, more particularly, to systems and methods for detecting generator ground faults using an injection source.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
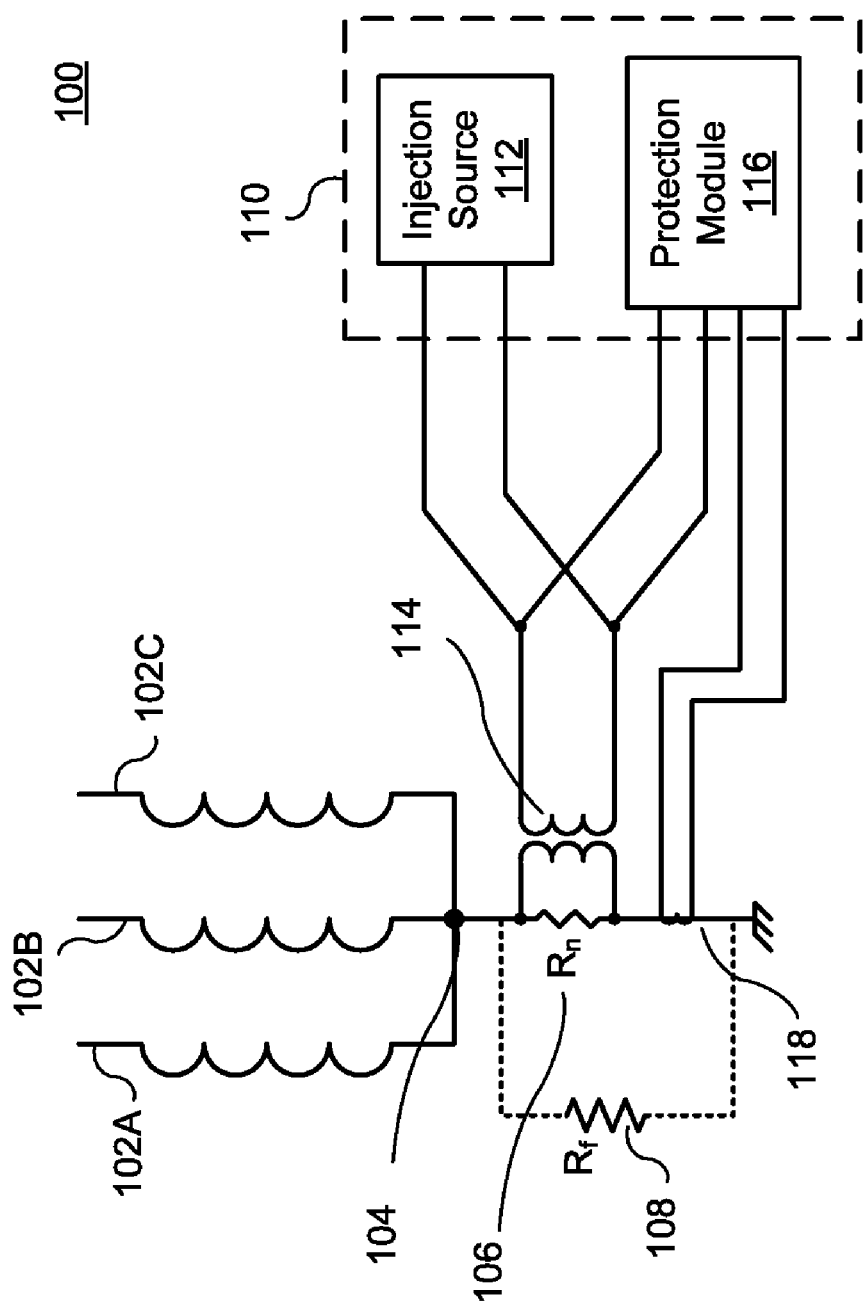
FIG. 1 illustrates a block diagram of one embodiment of a system including an electric generator utilizing high-impedance stator grounding that includes stator ground injection and protection.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer (or other electronic device) to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

An electrical power generation and distribution system may include power system equipment such as generators, circuit breakers, switches, buses, transmission lines, distribution lines, transformers, voltage regulators, capacitor banks, and the like. Such equipment may be monitored, controlled, automated, and/or protected using intelligent electronic devices ("IEDs") that receive electric power system information from the devices, make decisions based the information, and provide monitoring, control, protection, and/or automation outputs to the devices.

Electric generators may be monitored and protected from various malfunctions and/or conditions using one or more IEDs. For example, an IED may be used to monitor a generator for interruption of a rotor grounding path (i.e., brush liftoff). Embodiments of such an IED may utilize various protection algorithms, such as those disclosed in U.S. Pat. No. 7,498,818, titled "Apparatus and Method for Detecting a Brush Liftoff in a Synchronous Generator Rotor Circuit", which is hereby incorporated by reference.

Generators used in electric power generation and distribution systems may include stator grounding in a variety of configurations. For example, generator stator windings may be grounded using high-impedance, medium resistance, low resistance, low inductance, and/or resonant grounding configurations. Alternatively, stator windings may be ungrounded. Monitoring the grounding of the stator windings in an electric generator may protect the generator from damage in instances where the stator winding insulation or the stator grounding system malfunction.

FIG. 1 illustrates a block diagram of one embodiment of a system 100 that includes an electric generator utilizing high-impedance stator grounding and that includes stator ground injection and protection. Although various embodiments disclosed herein include generator windings integrated in a stator; however, generator windings integrated in a rotor are also contemplated. The generator includes three stator windings 102A, 102B, and 102C, each of which is coupled to node 104. Node 104 may be coupled to ground via a resistor 106 having a resistance of $R_n$. Consistent with some embodiments, a stator-to-ground fault path 108 having an equivalent path resistance of $R_f$ may be used in determining the occurrence of a stator grounding fault condition. Stator-to-ground fault path 108 is shown in phantom lines to designate that stator-to-ground fault path is not an actual component of system 100, but rather represents and equivalent electrical resistance of a path between the stator and ground.

Consistent with embodiments disclosed herein, the system 100 may include an IED 110 configured to monitor and protect the generator. The IED 100 may include an injection source 112 which is configured to inject an electrical signal across the resistor 106 via a transformer 114. In some embodiments, the injection source 112 may be further configured to provide the electrical signal to a protection module 116, which is configured to monitor the impedance of the stator-to-ground fault path 108. The protection module 116 may also be configured to receive an electrical signal provided by current transformer 118 relating to the current passing from the plurality of stator windings 102A, 102 B, and 102C. Based on the signals received by the protection module 116, the occurrence of a stator-to-ground fault condition can be detected and protective action may be taken to prevent damage to the generator.

Figure 2:
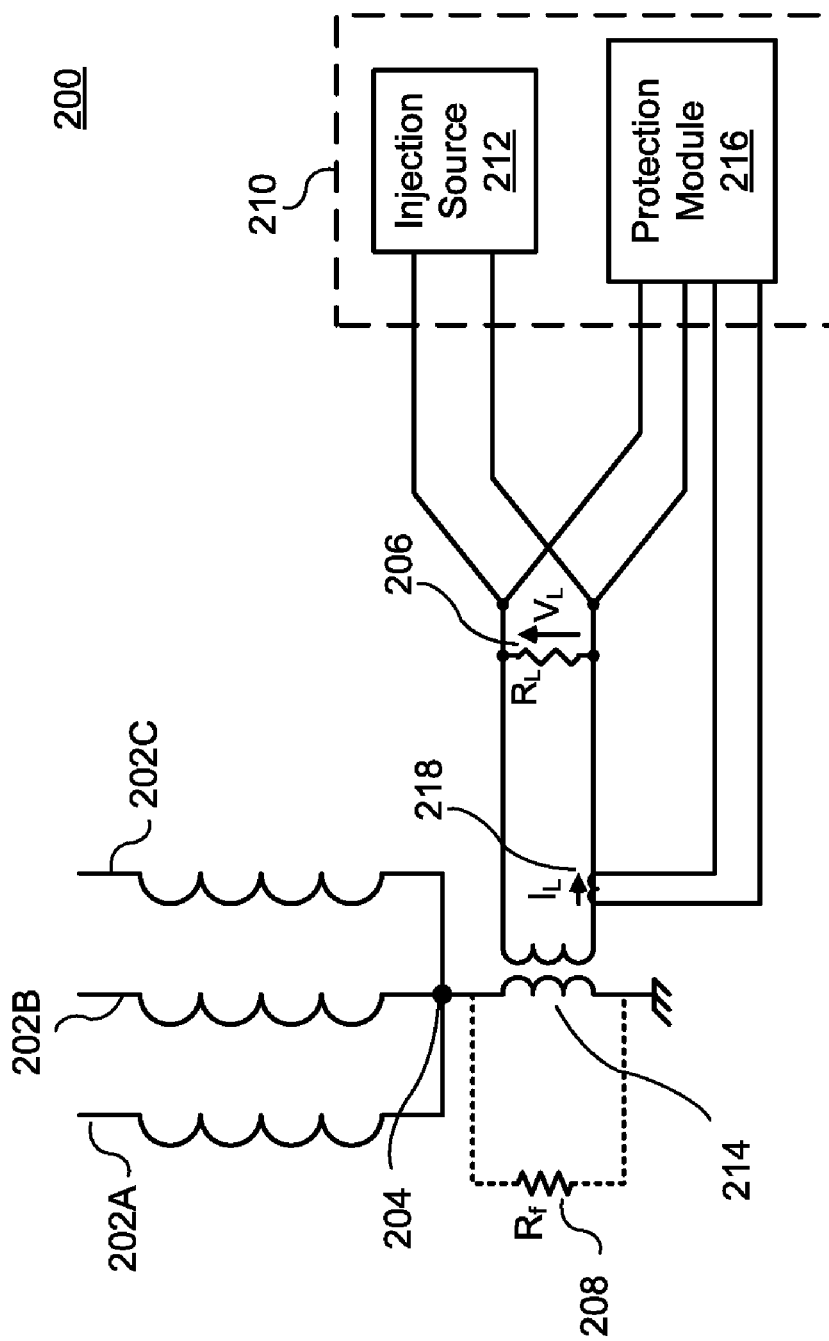
FIG. 2 illustrates a block diagram of one embodiment of a system including an electric generator utilizing high-impedance stator grounding that includes stator ground injection and protection.

FIG. 2 illustrates a block diagram of one embodiment of a system 200 including an electric generator utilizing high-impedance stator grounding that includes stator ground injection and protection. The generator of system 200 may include a plurality of stator windings 202A, 202B, and 202C, each of which is coupled to node 204. Node 204 may be coupled to ground via a high voltage side of a transformer 214. A resistor 206 having a resistance of $R_L$ may be coupled across a low voltage side of the transformer 214. Consistent with some embodiments, a stator-to-ground fault path 208 having a path resistance of $R_f$ may be used in determining the occurrence of a stator grounding fault condition. Stator-to-ground fault path 208 is shown in phantom lines to designate that stator-to-ground fault path is not an actual component of system 200, but rather represents and equivalent electrical resistance of a path between the stator and ground.

The system 200 may include an IED 210 configured to monitor and protect the generator. The IED 210 may include an injection source 212 which is configured to inject an electrical signal across the stator-to-ground path via transformer 214. In some embodiments, the injection source 212 may be further configured to provide the electrical signal to a protection module 216 configured to monitor the equivalent impedance of the stator-to-ground path 208. The protection module 216 may also be configured to receive an electrical signal provided by current transformer 218 relating to the current passing from the stator windings to ground. Based on the signals received by the protection module 216, the occurrence of a stator-to-ground fault condition can be detected and protective action may be taken to prevent damage to the generator of system 200.

Figure 3:
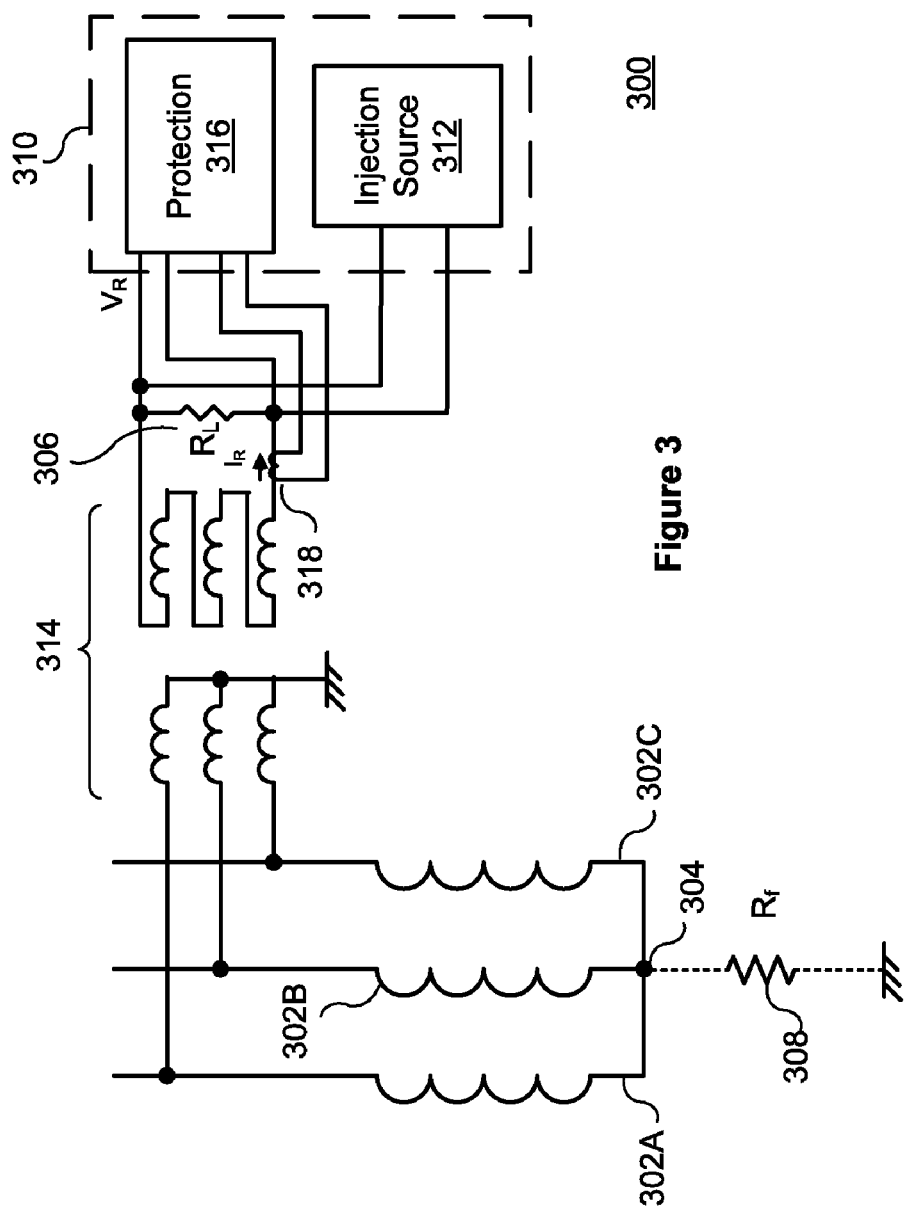
FIG. 3 illustrates a block diagram of one embodiment of a system including an electric generator utilizing high-impedance stator grounding that includes stator ground injection and protection.

FIG. 3 illustrates a block diagram of one embodiment of a system 300 including an electric generator utilizing high-impedance stator grounding that includes stator ground injection and protection. The generator may include a plurality of stator windings 302A, 302B, and 302C, each of which is coupled to node 304. In some embodiments, a stator-to-ground fault path 308 having a path resistance of $R_f$ may be used in determining the occurrence of a stator grounding fault condition. Stator-to-ground fault path 308 is shown in phantom lines to designate that stator-to-ground fault path is not an actual component of system 100, but rather represents and equivalent electrical resistance of a path between the stator and ground.

Consistent with some embodiments, the system 300 may include an IED 310 configured to monitor and protect the generator. The IED 310 may include an injection source 312 configured to inject an electrical signal across the generator stator windings 302A, 302B, and 302C via transformer 314. A resistor 306 having a resistance of $R_L$ may be coupled across a low voltage side of the transformer 314. In some embodiments, the injection source 312 may be further configured to provide the electrical signal to a protection module 316 configured to monitor leakage impedance of the stator windings. The protection module 316 may also be configured to receive an electrical signal provided by a current transformer 318 relating to the current passing from the stator windings to ground. Based on the signals received by the protection module 316, the occurrence of a stator-to-ground fault condition can be determined and protective action may be taken to prevent damage to the generator.

Figure 4:
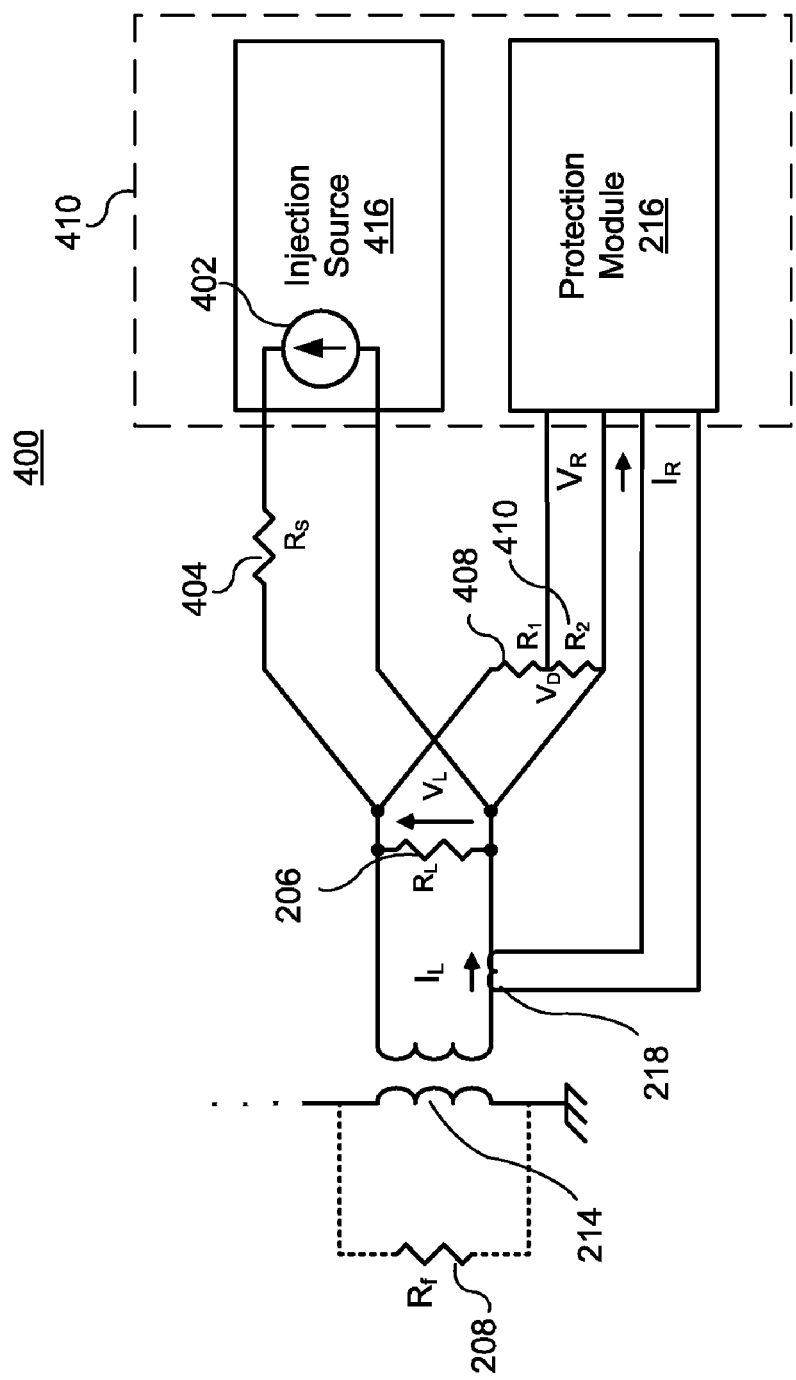
FIG. 4 illustrates a simplified block diagram of the system illustrated in FIG. 2.

FIG. 4 illustrates a block diagram of one embodiment of a system 400, which incorporates certain components also illustrated in FIG. 2. For ease of reference, those components in FIG. 4 that are also shown in FIG. 2 are designated with the same reference numbers. Similar principles may also be applied to systems 100 and 300, which are illustrated in FIG. 1 and FIG. 3, respectively. The IED 410 may include an injection source that includes a current source 402 and a source resistance 404. The current source 402 may inject an electrical signal across the stator-to-ground fault path 208 having a resistance of $R_f$.

In the absence of a stator-to-ground fault condition, the stator-to-ground fault path 208 will have a high equivalent impedance resistance, however, when a stator-to-ground fault condition occurs, the ratio of the voltage $V_L$ across resistor 206 to current $I_L$ will be proportional to the stator-to-ground fault path 208 resistance $R_f$ according to Equation (1).

$$\frac{V_L}{I_L} = \frac{R_f}{N^2} \tag{1}$$

In Equation (1), N is the winding ratio of the transformer 214.

The voltage $V_L$ across the transformer 214 and resistor 206 may be measured across a resistive voltage divider including resistors 408 and 410 having a ratio $D_R$ calculated according to Equation (2).

$$D_R = \frac{R_2}{R_1 + R_2} \quad (2)$$

In Equation (2), $R_1$ is the resistance of resistor 408 coupled between a first terminal of the injection source 416 and the protection module 216 and $R_2$ is the resistance of resistor 410 coupled between a second terminal of the injection source 416 and the protection module 216.

Based on a voltage $V_R$ measured across resistor $R_2$ and a current $I_R$ measured by current transformer 218, the fault resistance $R_f$ across the stator-to-ground path 208 may be calculated by the protection module 216 according to Equation (3):

$$R_f = \frac{V_R}{I_R} \frac{N^2 D_R}{n} \quad (3)$$

In Equation (3), N is the winding ratio of the transformer 214 and n is the winding ratio of current transformer 218.

Consistent with embodiments disclosed herein, by comparing the equivalent impedance of stator-to-ground fault path 208 to a specified resistance, the occurrence of a stator-to-ground fault condition may be detected. In some embodiments, if the equivalent impedance of stator-to-ground fault path 208 is below a specified threshold (i.e., indicating a stator-to-ground fault), then the protection module 216 will detect a fault condition and signal an IED accordingly. In response to the signal from the protection module 216, the IED may take action to protect the generator of system 200 from damage such as, for example, setting an alarm, setting a contact output, signaling a breaker to change state, or the like.

In some embodiments, the IED 410 may take different actions at different detected fault resistance $R_f$ thresholds. For example, if the detected fault resistance $R_f$ is below a first specified threshold, then the IED 410 may take a first action (e.g., setting off a visual alarm, an audio alarm, or the like) which may continue for either a specified or an unspecified length of time. If the equivalent impedance of stator-to-ground fault path 208 falls below a second specified threshold, then the IED may take a second action, which may include issuing a trip signal to stop the operation of the generator of system 200. In some embodiments, the second action may not commence until a specified time associated with the first action has elapsed.

In some embodiments, current source 402 may inject a signal modulated at 20 Hz. As electrical generators typically operate at nominal operating frequencies of 50 Hz or 60 Hz, the protection module 216 can differentiate the 20 Hz injection signal from signals resulting from the normal operating frequency of a generator 400 operating (e.g., 50 Hz or 60 Hz). During startup (or ramp up), the operating frequency of the generator may vary between 0 Hz and the nominal operating frequency. Accordingly, during startup, the actual operating frequency of the generator may be close to the frequency of a 20 Hz injection signal (e.g., from 10 Hz to 30 Hz during ramp up).

Figure 5:
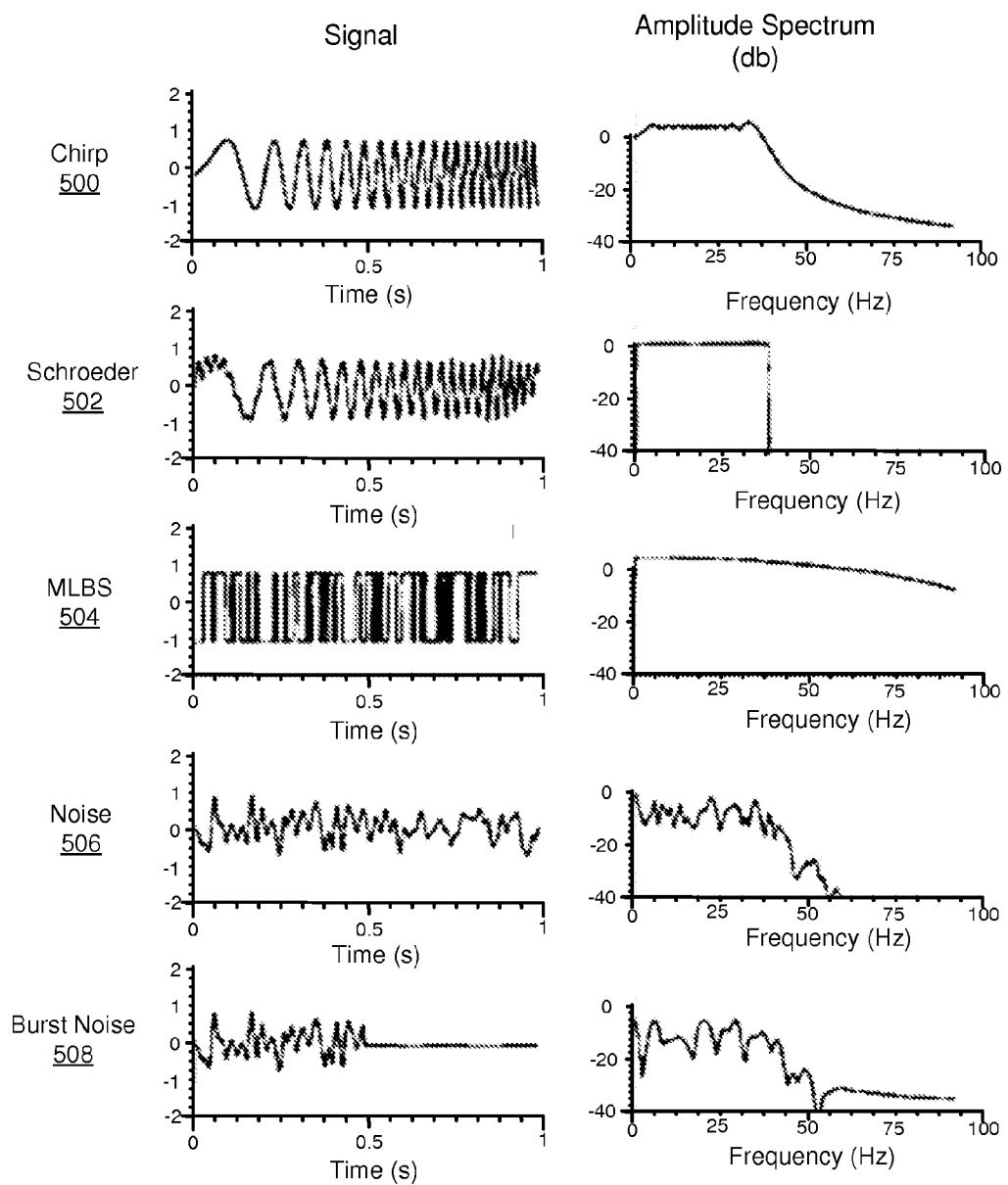
FIG. 5 illustrates injection signals that may be used by an intelligent electronic device to detect stator-to-ground fault conditions.

In accordance with embodiments disclosed herein, protection against stator-to-ground fault conditions during startup may be achieved using injection signals that can be differentiated from normal generator operating signals. FIG. 5 illustrates injection signals that may be used by an IED to detect stator-to-ground fault conditions. Injection signals output from an injection source may be designed to allow a protection module to differentiate the injection signal from normal generator operation signals. Such signals may include, for example, a chirp signal 500, a Schoreder Multisine signal 502, a maximum length binary sequence (MLBS) signal 504, a noise signal 506, and/or a burst noise signal 508.

In embodiments utilizing a Schoreder Multisine signal 502 as an injection signal, the signal may be generated according to Equation (4).

$$X(t) = \Sigma_{k=1}^F A \cos(2\pi f_k t + \phi_k) \quad (4)$$

In Equation (4), $f_k = k \cdot f_0$ (i.e., the component frequencies), $f_o$ is the frequency step (i.e., resolution), $$\frac{1}{f_0}$$

is the signal period (i.e., signal length), and $$\phi_k = -\frac{k(k-1)\pi}{F}$$

(i.e., the individual component phases).

Figure 6:
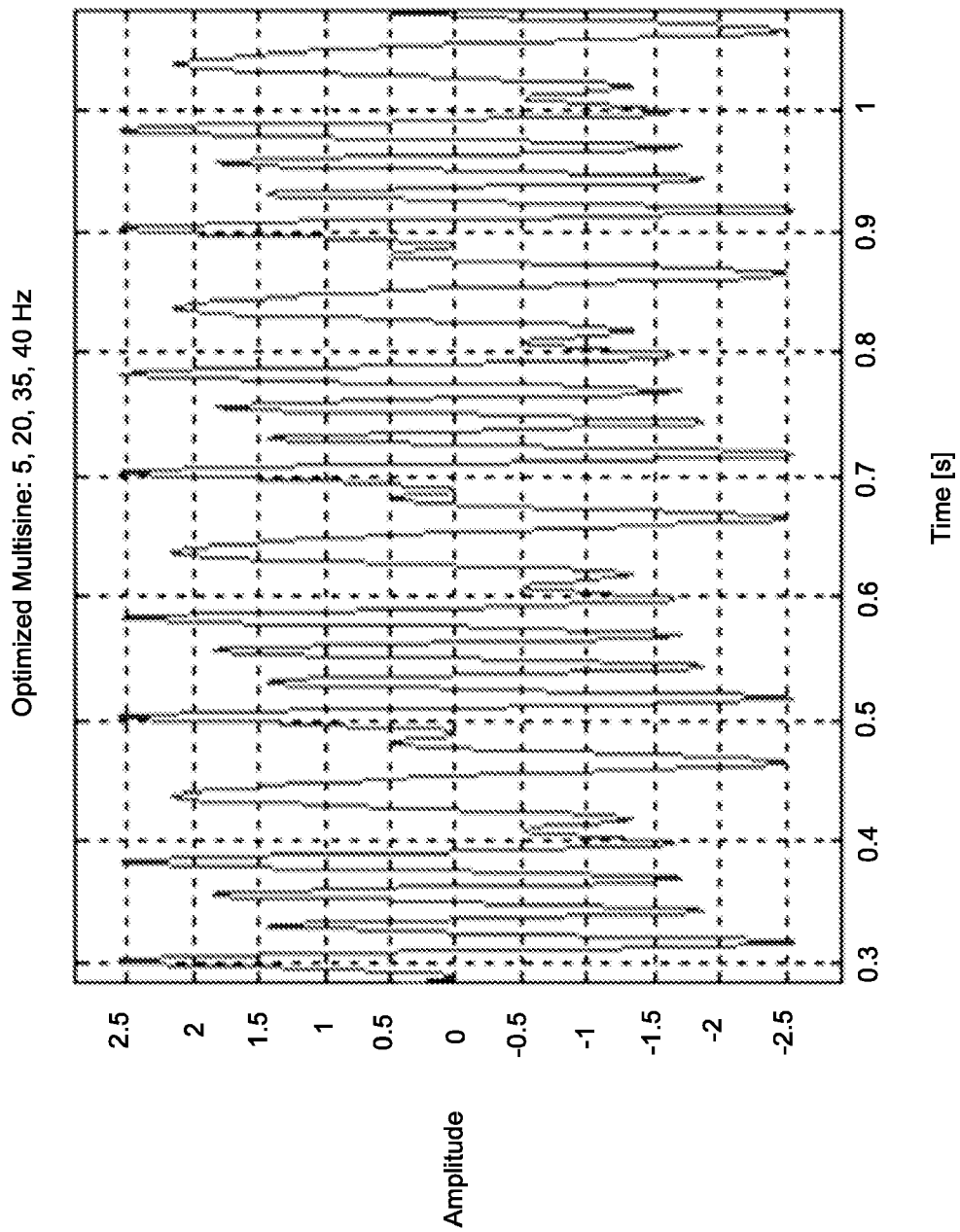
FIG. 6 illustrates a Schoreder multisine injection signal.

By selecting or omitting individual frequency components, modifying their amplitude, and modifying their phase, a Schoreder Multisine signal can be generated and injected to an IED to better distinguish the injected signal from other generator operating signals during start-up. For example, a Schoreder Multisine signal can be injected having a signal period (i.e., $1/f_o$) of 0.2 s and frequency components spaced 5 Hz apart. In some embodiments, the set of frequencies may be selected such that none are harmonically related to the nominal operating frequency of the generator. For example, if a generator has a nominal operating frequency of 50 Hz, a set of selected component frequencies ($f_k$) may include 15 Hz, 20 Hz, 35 Hz, and 40 Hz (i.e., none of which may be harmonically related to the generator nominal operating frequency of 50 Hz). A Schoreder Multisine signal having such component frequencies of 5, 20, 25, and 40 Hz is illustrated in FIG. 6. In certain embodiments, the injected signal may have a small average signal peak (i.e., peak-to-average ratio) allowing for use of the injection source over a dynamic range. Further, in some embodiments, non-linear optimization techniques can be used to reduce the peak-to-average ration for a signal having any given combination of selected frequency components.

Figure 7:
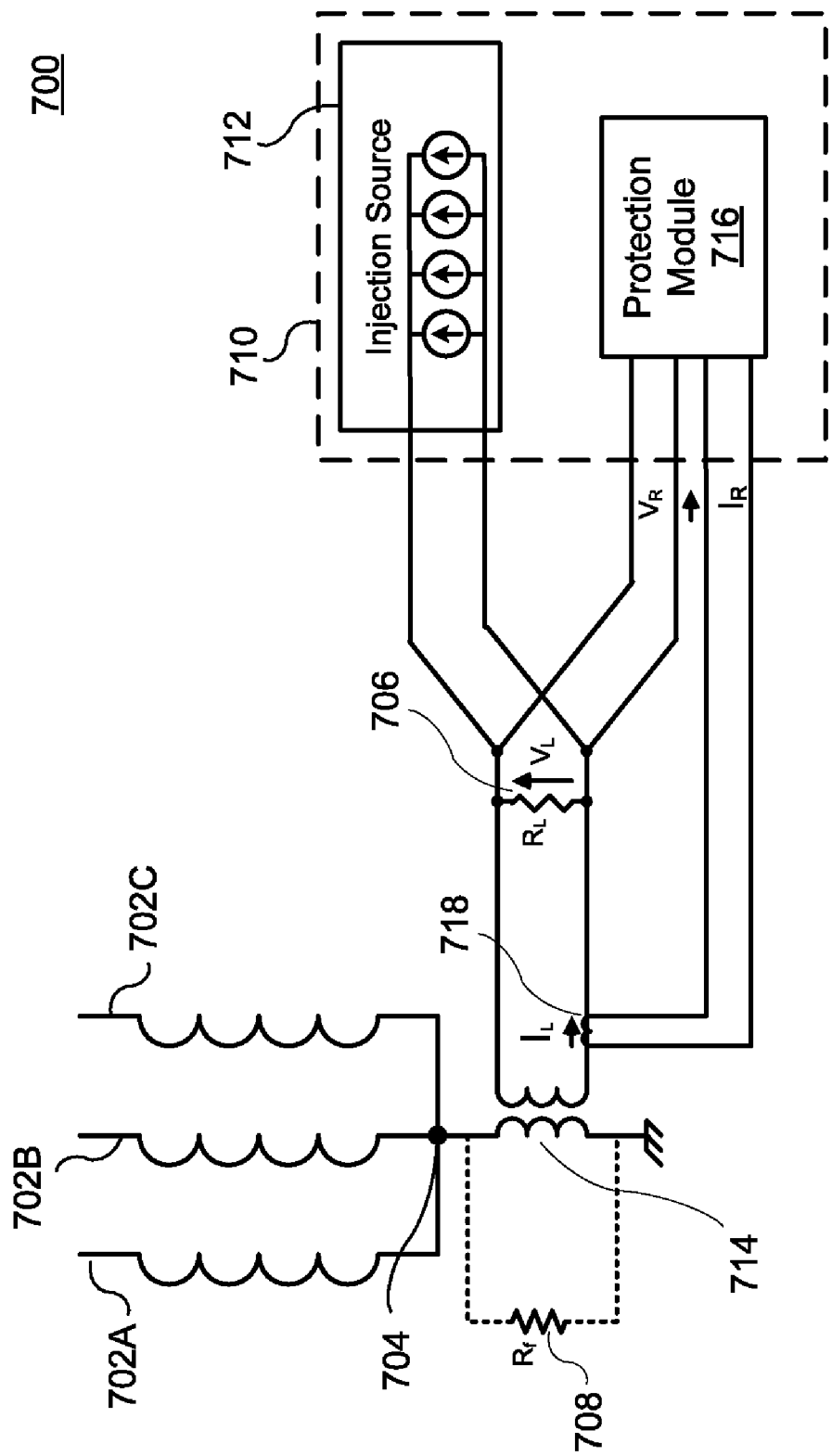
FIG. 7 illustrates a block diagram of one embodiment of a system that includes an electric generator having stator ground injection and protection utilizing a variable waveform injection source.

FIG. 7 illustrates a block diagram of one embodiment of a system 700 that includes an electric generator having stator ground injection and protection utilizing a variable waveform injection source 712. The generator of system 700 may include a plurality of stator windings 702A, 702B, and 702C, each of which is coupled to a node 704. Node 704 may be coupled to ground via a high voltage side of a transformer 714. A resistor 706 having a resistance of $R_L$ may be coupled across a low voltage side of the transformer 714. Consistent with some embodiments, a stator-to-ground fault path 708 having an equivalent resistance of $R_f$ may be used in determining the occurrence of a stator-to-ground fault condition. Stator-to-ground fault path 708 is shown in phantom lines to designate that stator-to-ground fault path is not an actual component of system 100, but rather represents and equivalent electrical resistance of a path between the stator and ground.

In some embodiments, the system 700 may include an IED 710 configured to monitor and protect the generator of system

700. The IED 710 may include a variable waveform injection source 712 configured to inject an electrical signal across the stator-to-ground path via transformer 714. In some embodiments, the variable waveform injection source 712 may be further configured to provide the injected electrical signal to a protection module 716, which is configured to monitor the impedance of the stator-to-ground path 708. The protection module 716 may also be configured to receive an electrical signal provided by current transformer 718 relating to the current passing from the stator windings to ground. Based on the signals received by the protection module 716, the occurrence of a stator-to-ground fault condition can be determined and protective action may be taken to prevent damage to the generator and/or system 700.

In some embodiments, the variable waveform injection source 712 may be capable of generating a plurality of injection signal waveforms such as, for example, the signal waveforms illustrated in FIG. 5 and FIG. 6. As illustrated in FIG. 7, the variable waveform injection source 712 may be modeled as a plurality of current sources connected in parallel (e.g., in the instance when a set of multiple component frequencies are selected), each with its own independently selected signal frequency. By changing the number of current sources and their respective output frequencies and/or amplitudes in the variable waveform injection source 712, the injection signal waveform may also be changed and/or optimized. In some embodiments, the injected signal may be optimized based on the specific parameters of the generator of system 700 protected by the IED 710 such as, for example, the nominal operating frequency of the generator.

Figure 8:
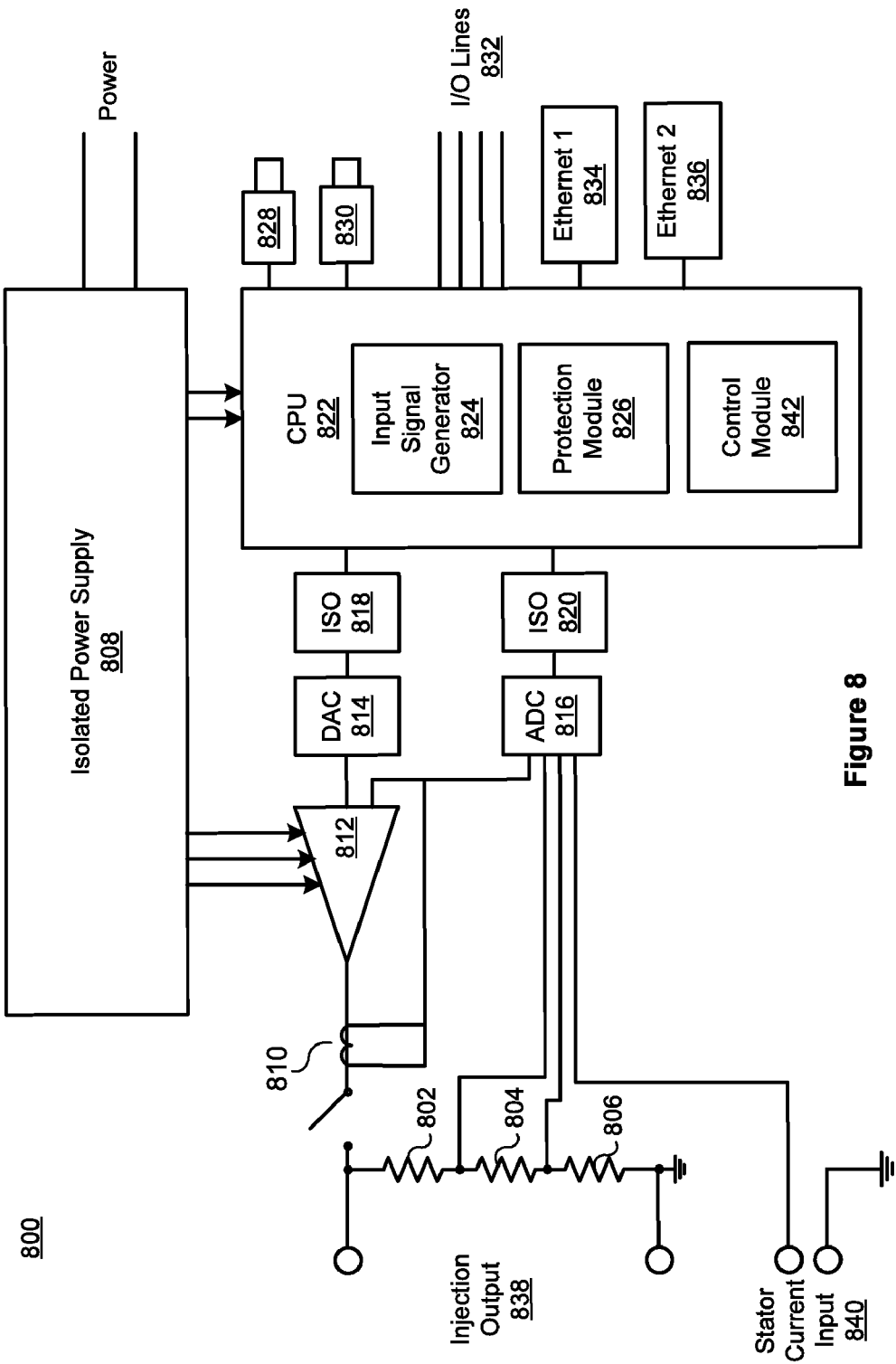
FIG. 8 illustrates a block diagram of one embodiment of an intelligent electronic device configured to generate an injection input signal and to monitor a generator for stator-to-ground fault conditions.

FIG. 8 illustrates a block diagram of one embodiment of an IED 800 configured to generate an injection input signal and to monitor a generator (not shown) for stator-to-ground fault conditions. As illustrated, the IED 800 may include an isolated power supply 808 configured to supply an injection signal to an injection output 838 from power received from a power source separate from the generator. In some embodiments, the isolated power supply 808 may be configured to supply the injection signal even when the generator is not operating. The isolated power supply 808 may be further configured to provide power to a central processing unit (CPU) 822.

In certain embodiments, the CPU 822 may include a processor, which in various embodiments may comprise one or more microprocessors, field programmable gate arrays (FPGAs), application specific integrated circuits (ASICs), and the like, configured to execute electronic instructions stored on a computer-readable media in electronic communication with CPU 822. The CPU 822 may execute one or more functional modules including, for example, an input signal generator module 824, a protection module 826, and or a control module 842. In some embodiments, the input signal generator module 824 may be configured to generate an injection signal provided to the generator from the IED 800 via the injection output 838. Particularly, the input signal generator module 824 may direct a digital-to-analog converter (DAC) 814 coupled to the CPU 822 via an isolation buffer circuit (ISO) 818 to output an analog injection signal. In certain embodiments, the analog injection signal output by the DAC 814 may be amplified by an amplifier 812 (e.g., a wide-band amplifier, a class-D amplifier, and/or a high-efficiency amplifier) which may receive power from power supply 808.

The injection signal output current from the amplifier 812 may be sampled by a analog-to-digital converter (ADC) 816 via a current transformer 810. Further, the injection signal output voltage from amplifier the amplifier may be sampled by the ADC 816 via a resistive divider including resistors 802, 804, and 806. Additionally, the current passing from generator stator windings to ground may be received by the IED 800 from current transformers (e.g., current transformers 120, 220, and 320 illustrated in FIGS. 1-3, respectively) at a stator current input 840 and sampled by the ADC 816. In response to these inputs, the ADC 816 may provide information related to the sampled injection signal output current and voltage as well as the sampled stator-to-ground current to the CPU 822. In some embodiments, the information provided to the CPU 822 from the ADC 816 may be routed via an ISO 820.

Consistent with some embodiments, a protection module 826 executed by the CPU 822 may use the information provided by the ADC 816 in conjunction with information regarding the transformer winding ratios, current transformer winding ratios, and the resistances of resistors 802-806 to calculate the equivalent impedance of a stator-to-ground fault path utilizing Equation 3. By comparing the equivalent impedance to a specified resistance, the occurrence of a stator-to-ground fault condition may be detected. As discussed previously, if the equivalent impedance of a stator-to-ground fault path is below a specified threshold (i.e., indicating a stator-to-ground fault), then the protection module 826 may take action to protect the generator from damage such as, for example, setting an alarm, setting a contact output, actuating a breaker, or the like.

In some embodiments, the protection module 826 may receive information from the input signal generator module 824 regarding the injection signal. Analysis of the signals sampled by DAC 814 and ADC 816 may be performed using a discrete Fourier transformer, a long Cosine Filter, or other filters of a length at or near the signal period ($1/f_0$).

In some embodiments, CPU 822 may execute a control module 842, which is configured to facilitate communication with the IED 800 (e.g., via IEC 61850 protocol, Ethernet standard, SONET, or the like). In some embodiments, the control module 842 may direct the IED 800 or another apparatus communicatively coupled to the IED 800 to take action to protect the generator from damage when a stator-to-ground fault is detected by the protection module 826.

The IED 800 may interface with other electric power system devices via one or more data input/outputs (I/O) 828-836. For example, the IED 800 may include fiber optic interfaces 828-830, contact I/O interfaces 832, and Ethernet ports 834-836, which in some embodiments may utilize Ethernet fiber. In some embodiments, the data I/Os 828-836 may interface the IED 800 with a human machine interface (HMI) device, a laptop computer, a desktop computer, a supervisory control and data acquisition (SCADA) system, a wide area control and situational awareness (WCSA) system, or any other similar system. The data I/Os 828-836 may be communicatively coupled to the CPU 822.

In some embodiments, CPU 822 may execute a control module 842, which is configured to facilitate communication with the IED 800 (e.g., via IEC 61850 protocol, Ethernet standard, SONET, or the like). In some embodiments, the control module 842 may direct the IED 800 or another apparatus communicatively coupled to the IED 800 to take action to protect the generator from damage when a stator-to-ground fault is detected by the protection module 826.

Figure 9:
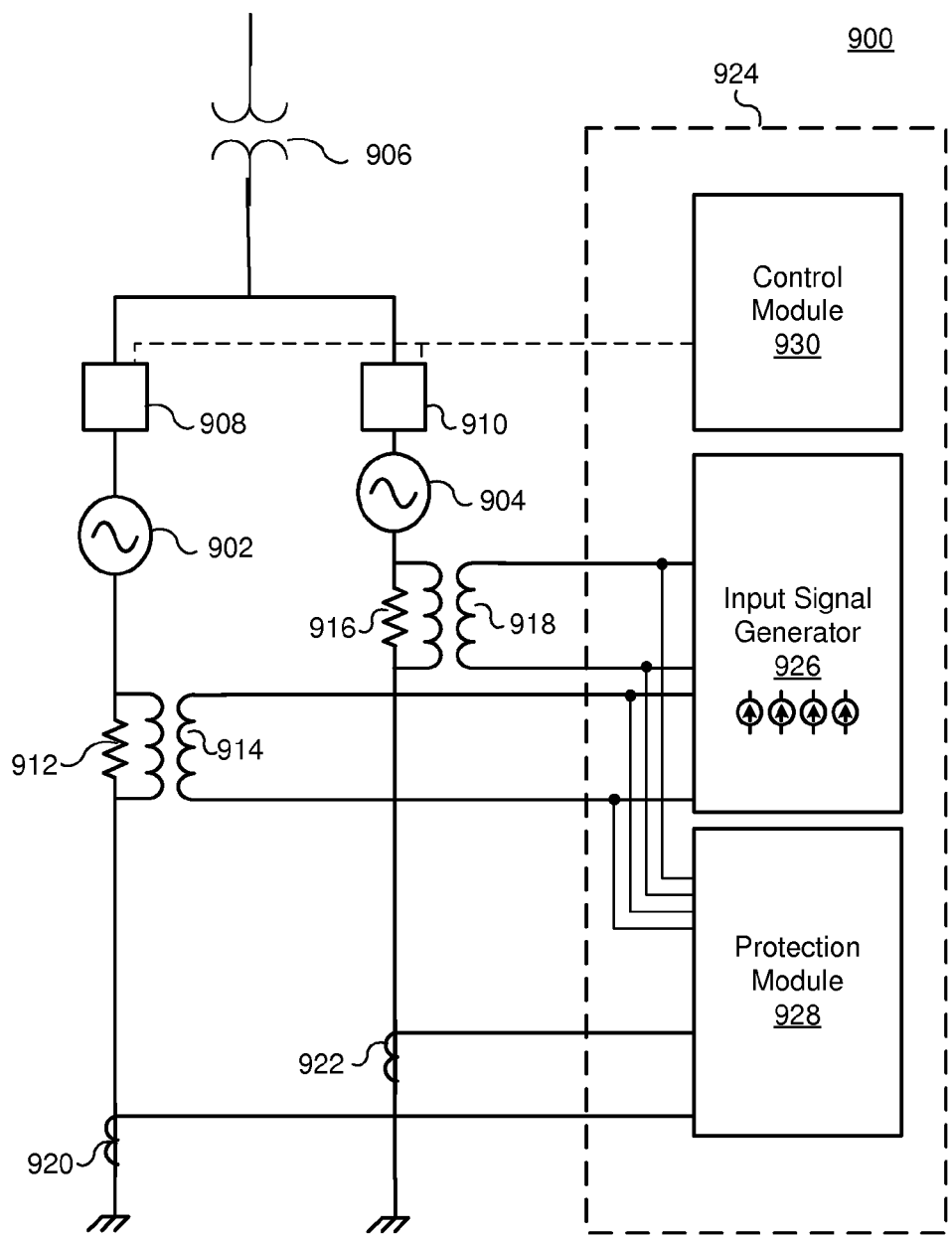
FIG. 9 illustrates a diagram of an intelligent electronic device configured to monitor and protect a system including multiple generators from stator-to-ground faults.

FIG. 9 illustrates one embodiment of a system 900 configured to monitor and protect multiple generators 902 and 904 from stator-to-ground faults. As illustrated, the generators 902 and 904 may be coupled to a transformer 906 (e.g., a step up transformer), which in some embodiments may be integrated in a delta-wye configuration. Stator windings of generators 902 and 904 may be coupled to ground by resistors 912 and 916, respectively. Further, breakers 908 and 910 may be coupled between the generators 902 and 904, respectively, and the step-up transformer 906. In some embodiments, Breakers 908 and 910 may be actuated by instructions generated by control module 930.

Consistent with embodiments disclosed herein, the system 900 may include an IED 924 configured to generate one or more injection input signal(s) and to monitor the generators 902 and 904 for stator-to-ground fault conditions. An input signal generator 926 included in IED 924 may be configured to generate one or more signals (e.g., a Schroeder Multisine signal) injected by input signal generator 926 via transformers 914 and 918 for monitoring generators 902 and 904, respectively. The input signal generator 926 may provide the injected signal to a protection module 928 included in the IED 924 for use in detecting stator-to-ground faults in generators 902 and 904. The protection module 928 may be further configured to receive stator-to-ground current data from current transformers 920 and 922.

Based on the injected signal, data from current transformers 920 and 922, and known device parameters, the protection module 928 may detect the occurrence of a stator-to-ground fault conditions and take protective action to prevent damage to generators 902 and 904. In some embodiments, the protection module 928 illustrated in FIG. 9 may be further configured to determine which of generators 902 and 904 is experiencing a stator-to-ground fault. In such embodiments, a different injection signal may be generated and injected by input signal generator 926 to each of generators 902 and 904. For example, the input signal generator 926 may be configured to generate a Schroeder Multisine signal utilizing four discrete frequencies and to output two frequencies to each of the injection transformers 914 and 918. Based on these different injected signals, the protection module 928 may determine which generator 902 or 904 is exhibiting a stator-to-ground fault condition using, for example, a zero-sequence approach.

In certain embodiments, data from the current transformers 920 and 922, including measured current levels, may be compared by the protection module 928 for each of a plurality of injected signal frequencies. Current level at a particular frequency may be proportional to the distance to the fault from a given injection source. In some embodiments, when there is no fault, measured current levels may be similar. Based on this relationship, the protection module 928 may compare the measured current levels to determine information related to the location of a fault.

Many changes may be made to the details of the above-described embodiments without departing from the underlying principles of this disclosure. The scope of the present invention should, therefore, be determined only by the following claims.

What is claimed is:

1. A generator winding-to-ground fault detection system, comprising:
a first signal injection source in electrical communication with a first winding of a first electric power generator via a first injection transformer, the first signal injection source comprising a first signal generator for generating a first injection signal capable of being injected to the first winding using the first injection transformer, the first winding being coupled to ground via a first path; and
a protection module in communication with the first signal injection source and the first electric power generator, the protection module configured to receive the first injection signal and a signal relating to the current through the first path and to determine the occurrence of a winding-to-ground fault condition based at least in part on the first injection signal and the signal relating to the current through the first path,
wherein the first injection signal is configured to enable the protection module to differentiate the first injection signal from signals resulting from normal operation of the first electric power generator.

2. The system of claim 1, wherein the first injection source is a variable waveform source.

3. The system of claim 1, wherein the first injection signal comprises a random signal.

4. The system of claim 1, wherein the first injection signal comprises a multisine signal.

5. The system of claim 4, wherein the multisine signal comprises a select subset of frequencies.

6. The system of claim 5, wherein the select subset of frequencies comprises frequencies that are not harmonically related to a nominal operating frequency of the generator.

7. The system of claim 4, wherein the multisine signal is a Schroeder multisine signal.

8. The system of claim 1, wherein the first injection signal comprises multiple frequencies.

9. The system of claim 1, wherein the protection module is configured to take action to protect the electric power generator from damage when the occurrence of a winding-to-ground fault condition is detected.

10. The system of claim 1, wherein:
the first signal injection source is in electrical communication with a second winding of a second electric power generator via a second injection transformer,
the first signal generator of the first signal injection source is configured to generate a second injection signal capable of being injected to the second winding using the second injection transformer, the second winding being coupled to ground via a second path, and
the protection module is in communication with the second electric power generator and is configured to receive the second injection signal and a signal relating to the current through the second path and to determine the occurrence of a winding-to-ground fault condition based at least in part on the second injection signal and the signal relating to the current through the second path.

11. The system of claim 10, wherein the protection module is further configured to determine which of the first and second windings are experiencing a winding-to-ground fault condition.

12. The system of claim 1, further comprising:
a second signal injection source in electrical communication with a second winding of a second electric power generator via a second injection transformer, the second signal injection source comprising a second signal generator configured to generate a second injection signal capable of being injected to the second winding using the second injection transformer, the second winding being coupled to ground via a second path,
wherein the protection module is in communication with the second electric power generator and is configured to receive the second injection signal and a signal relating to the current through the second path and to determine the occurrence of a winding-to-ground fault condition based at least in part on the second injection signal and the signal relating to the current through the second path, and
wherein the first and second electric power generators are connected to a transformer in parallel.

13. The system of claim 12, wherein the system further comprises a communications port and a processor in communication with the communications port, wherein the protection module and a communications module is executed by the processor.

14. The system of claim 12, wherein the first injection signal is different from the second injection signal.

15. The method of claim 14, wherein the injection signal comprises multiple frequencies.

16. The method of claim 14, wherein the detecting a winding-to-ground fault condition includes measuring the impedance of the winding-to-ground path.

17. The method of claim 14, wherein the method further comprises taking action to protect the electric power generator from damage when the occurrence of a winding-to-ground fault condition is detected.

18. A method for detecting winding-to-ground faults in a generator comprising:
   injecting, by a signal injection source comprising a signal generator in electrical communication with a winding of a electric power generator via an injection transformer, an injection signal to the winding using the injection transformer, the winding being coupled to ground via a winding-to-ground path; and
   detecting, by a protection module in communication with the signal injection source and the electric power generator, the occurrence of a winding-to-ground fault condition based at least in part on the injection signal and a signal relating to the current through the winding-to-ground path,
   wherein the injection signal is generated to enable the protection module to differentiate the injection signal from signals resulting from the normal operation of the electric power generator, and wherein the protection module receives the injection signal.

19. The method of claim 18, wherein the injection source is a variable waveform source.

20. The method of claim 18, wherein the injection signal comprises a noise-like signal.

21. The method of claim 18, wherein the injection signal comprises a multisine signal.

22. The method of claim 21, wherein the multisine signal comprises a select subset of frequencies.

23. The method of claim 22, wherein the select subset of frequencies comprises frequencies that are not harmonically related to a nominal operating frequency of the generator.

24. The method of claim 22, wherein the multisine signal is a Schroeder multisine signal.

25. The method of claim 24, wherein the protection module is configured to detect a winding-to-ground fault condition using the multiple frequencies.

26. An intelligent electronic device, comprising:
   an injection output configured to be couple to a winding of a generator;
   a processor;
   a computer readable storage medium, comprising:
   a signal injection module executable on the processor and configured to generate an injection signal capable of being injected to the winding of the generator via the injection output, the winding being coupled to ground via a path; and
   a protection module executable on the processor and configured to receive the injection signal and a signal relating to the current through the path and configured to determine the occurrence of a winding-to-ground fault condition based at least in part on the injection signal and the signal relating to the current through the path.

* * * * *